United States Patent [19]

Schirrmacher

[11] Patent Number: 4,561,318
[45] Date of Patent: Dec. 31, 1985

[54] LEVER POWER SYSTEM

[76] Inventor: Douglas R. Schirrmacher, 19201 Dearborn Ave., Northridge, Calif. 91324

[21] Appl. No.: 309,201

[22] Filed: Oct. 5, 1981

[51] Int. Cl.⁴ .................... F16H 25/16; B62M 1/00
[52] U.S. Cl. ........................................ 74/54; 280/253
[58] Field of Search ............... 74/42, 43, 88, 54; 280/244, 253

[56] References Cited

U.S. PATENT DOCUMENTS

| | | | |
|---|---|---|---|
| 394,890 | 12/1888 | Staeber | 280/253 |
| 594,980 | 12/1897 | Booth et al. | 280/253 |
| 1,427,589 | 8/1922 | Greenison | 280/253 |

FOREIGN PATENT DOCUMENTS

| | | | |
|---|---|---|---|
| 636792 | 10/1936 | Fed. Rep. of Germany | 280/253 |
| 2513075 | 10/1976 | Fed. Rep. of Germany | 280/253 |
| 332882 | 12/1935 | Italy | 280/253 |

*Primary Examiner*—Lawrence J. Staab

[57] ABSTRACT

An apparatus is disclosed herein for translating an input power force into an increased power output via a power multiplier unit. The apparatus comprises a plurality of lever arms pivotal carried on supporting structure so that a portion of the lever arm extending beyond the pivot connection constitutes a cam surface upon which roller cams operate to convert up-and-down lever arm movement to rotary movement of a sprocket gear carried on a rotatable shaft. The roller cams associated with each lever arm are arranged with respect to each other so that the cams operate from the lever arms as the lever arms are driven differentially. An output drive shaft is operably coupled to the sprocket gear for receiving an imparted driving force thereto. Timing linkage interconnects the lever arms with the sprocket and its shaft for augmenting the translation of power by smoothing the transition of movement between the roller cams and the lever arm cam surfaces.

1 Claim, 4 Drawing Figures

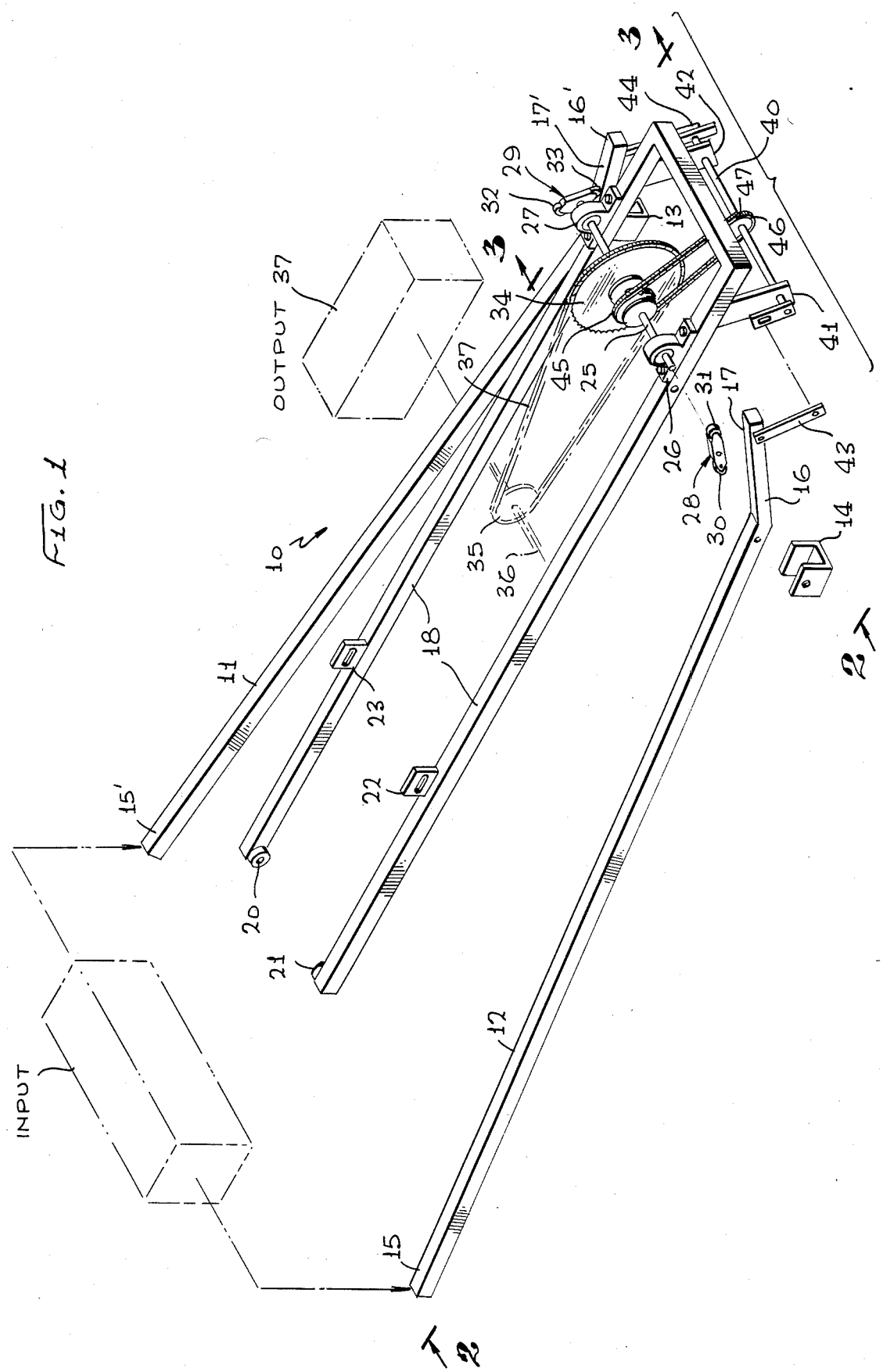

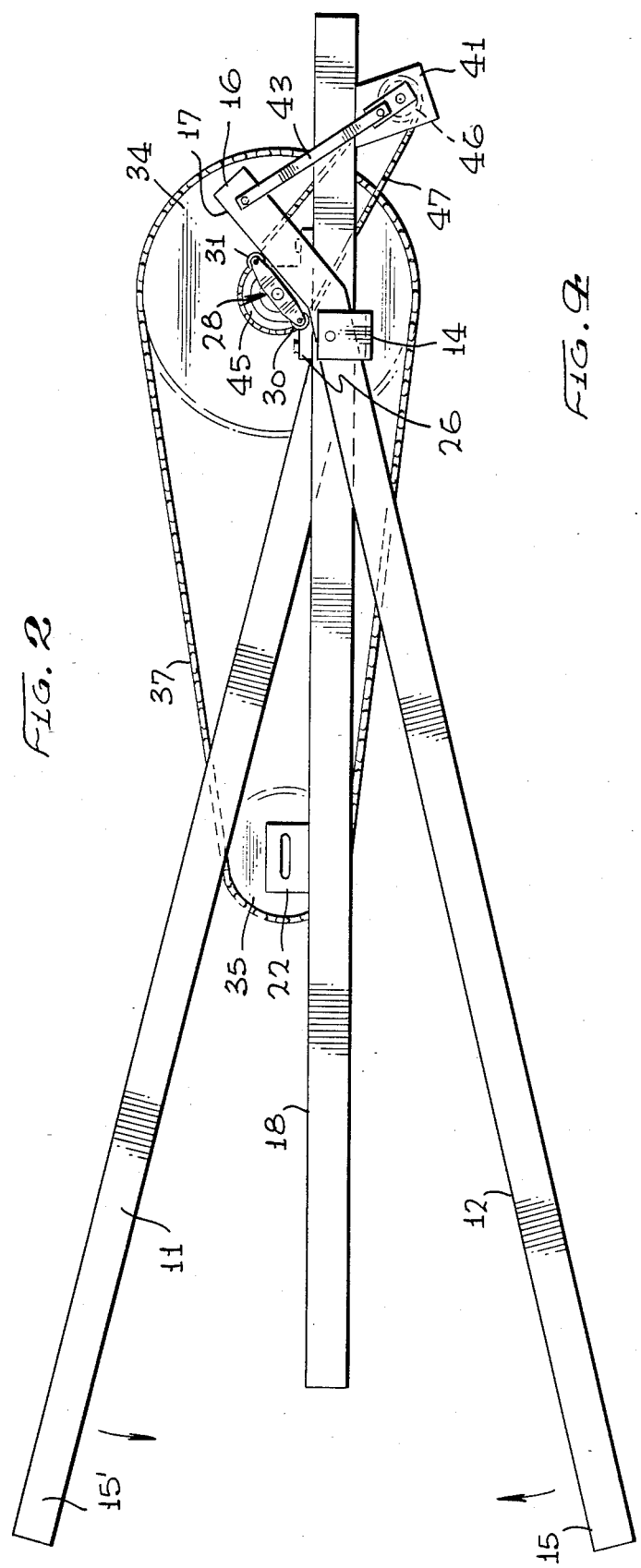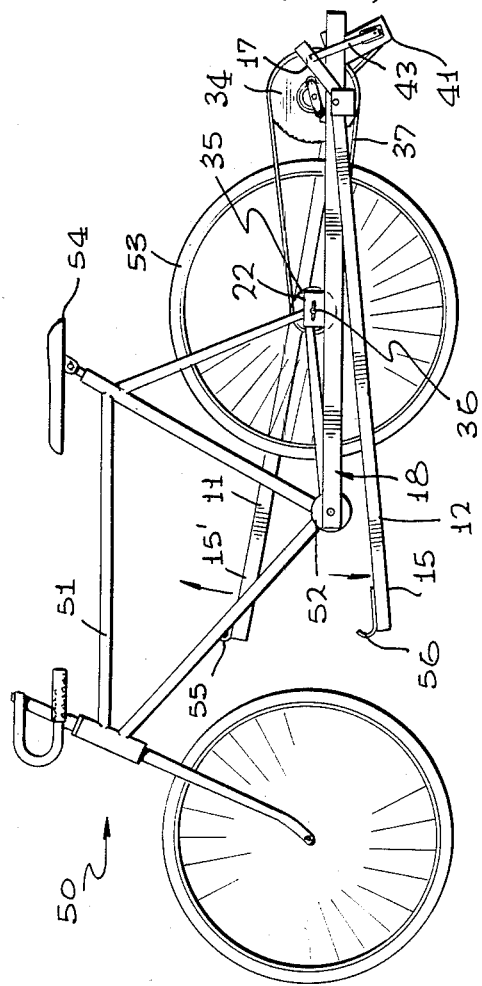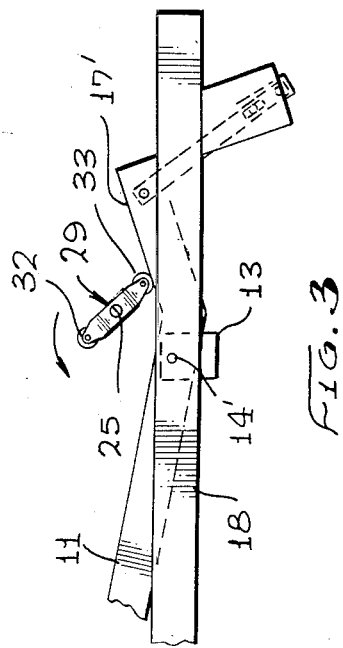

LEVER POWER SYSTEM

BACKGROUND OF THE INVENTION

1. Field of the Invention

The invention relates to prime mover power sources more particularly, to a novel power source for the power derived from an input source via a power multiplying unit so that sufficient increased force is generated to perform useful work.

2. Brief Description of the Prior Art

Man's improved technology has wrought tremendous advances in many fields and, in particular, the science of power multiplication influences almost every field of human activity. The wide and varied uses of power sources and power multiplication form an integral, essential component of driving forces and the very heart of most power plants, motors, generators or the like. Almost all mechanical and electrical equipment utilizes features of power multiplication either directly or in these power translation networks therefore.

Although prime moving power sources are one of the oldest forces known to man, little has been done to harness the multiplication forces of the prime mover in the form of a practical and efficient means. Generally, power sources, such as prime moving motors and generators, for example, are presently being designed and fabricated by convential methods and to standards which have been in use for many years. These designs and methods usually involve conversion of mechanical or electrical energy into mechanical work by employing such elements as field poles, armatures, condensers, brushes, or in the case of mechanical systems, such units as scissors, block and tackle mechanisms or the like.

In some instances, involving extremely small power outputs, manual forces have been employed in such devices as cranking systems or the like; however, these devices and systems are totally unsuitable for developing sufficient power to operate under conditions requiring a substantial loading of the power source such as may be used for a wide variety of tasks as in pumps, vehicle propulsion and other mechanical and hydraulic apparatus when the power source is heavily loaded at all times. Therefore, improvement in primary power sources incorporating multiplication factors and techniques which are permitted by modern technological approach and conceptual improvement can readily reduce the cost and complexity of such primary power sources and make the power sources more durable, long lived and more compact by effecting the controlled multiplication of an input power force which can then be readily applied to effect major mechanical displacement as an output resultant.

Although some of the prior art devices have been successfully operated for their intended purposes, many of the devices are complex and are bulky so that they cannot be readily accomodated into modern day power and energy applications. In other instances, the weight-to-strength ratio is extremely high so that the device is not feasible for many applications.

Therefore, a longstanding need has existed to provide a power multiplying apparatus which will readily translate or convert to power from an input source to an output load which is increased or converted to a more powerful energy application.

SUMMARY OF THE INVENTION

Accordingly, the above problems and difficulties are obviated by the present invention which provides a novel power multiplication apparatus for increasing the power derived from an input source via a multiplication unit.

In one form of the invention, an input means is provided having a plurality of differentially operated lever arms for sequentially operating cam means which translate rectilinear movement into rotational movement of a drive sprocket gear. Output means are operably coupled to the rotating sprocket gear for imparting multiplied power to a load. Timing linkage means are operably interconnected to the lever means for linking the lever arms to the cam means so that power transfers smoothly during operation of the apparatus.

Therefore, it is among the primary objects of the present invention to provide a novel power multiplier means incorporating a novel differential level mechanism for translating a power input to an increased power output.

Another object of the present invention is to provide a novel power multiplier whereby a plurality of pivoting lever means or mechanisms may be arranged in combination with cam means to increase the power input by achieving an increased power output at the output end.

Another object of the present invention is to provide a novel energy conversion device whereby power input is increased even though distance or displacement of the input device is the same as distance or displacement of the output means.

Still another object of the present invention is to provide a novel power conversion means incorporating a power multiplier unit whereby input displacement and power is increased by a power multiple wherein distance remains the same.

Yet another object of the present invention is to provide a novel power conversion means wherein rectilinear movement by lever means is translated into rotational power means and coupled to an output wherein the power is a multiple of the input power displacement.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a diagramatic view in perspective of an apparatus incorporating the present invention;

FIG. 2 is a side elevational view of the apparatus shown in FIG. 1 is taken in the direction of arrows 2—2 thereof;

FIG. 3 is a fragmentary sectional view illustrating the camming means used in the apparatus of FIG. 1 as taken in the direction of arrows 3—3 thereof; and FIG. 4 is a side elevational view of a bicycle incorporating the power multiplication means of the present invention as a typical application of the inventive concept.

DESCRIPTION OF PREFERRED EMBODIMENT

Referring to FIG. 1, the novel lever power system of the present invention is illustrated in the general direction of arrow 10 which is a mechanical device having a basic function of converting an amplitude of power in the form of linear motion into mechanical energy. A set of differentially operating lever arms 11 and 12 are arranged to pivot around a fixed fulcrum identified by numerals 13 and 14 respectively. Each lever includes an elongated portion terminating in a free end 15 and 15 prime respectively against which an input force is applied. The opposite end of each lever arm terminates in a lever portion 16 and 16 prime respectively which is in angular displacement or orientation with respect to the elongated portion terminating in ends 15 and 15 prime. The shortened portions 16 and 16 prime include cam surfaces 17 and 17 prime associated with each of the lever portions. Therefore, a lever system of the first class is defined wherein the mechanical advantage is greater than one since the lengths of the lever portions on opposites sides of the fulcrum are of different dimensions.

Disposed between the set of lever arms 11 and 12 is a fixed frame or chassis indicated in general by the numeral 18. The chassis 18 includes mounting pins or fixtures 20 and 21 as well as securement eyelets 22 and 23, all of which may be employed for securing the apparatus to a proper device or load for converting the amplitude of power into mechanical energy.

The set of lever arms are of overall equal length, each having a slight angle after the pivot point or fulcrum which incorporates the cam surfaces. The set of levers each have separate pivot points attached to fixtures 13 and 14 respectively and the lever arms always travel in opposite directions as indicated by the arrows associated with the input power ends 15 and 15 prime. The input motive power acts on only one side at a time and always its input force is directed upon the downward traveling lever arm. Upward rotation of the arm is considered in an idle condition.

In order to effect conversion, cam follower means are incorporated which include a main axle 25 rotatably carried by proper bearings within pillow blocks 26 and 27 carried on opposite sides of the frame 18. The respective ends of the main axle 25 include cams 28 and 29 which are arranged normal with respect to each other and wherein each cam 28 and 29 terminates at its opposite ends with rollers, such as rollers 30 and 31 associated with cam 28 and rollers 32 and 33 associated with cam 29. The rollers accept transmission of power from the lever arms via the cam surfaces 17 and 17 prime upon which the rollers engage and are driven. As a selected one of the lever arms is pivoting downward in response to applied force on its input end 15, the cam surface 17 will forcibly urge the respective cam rollers 30 or 31 to rotate the main axle 25 in a counterclockwise direction. A sprocket gear 34 is fixedly attached to the main axle 25 which rotates as a result of the movement imparted from the lever arm. A drive gear 35 is carried on an output shaft 36 and is driven in a rotating manner from the sprocket gear 35 by means of an interconnecting chain 37. The output shaft 36 is directly connected to a load or output 37 as required.

The lever power system is arranged so that four lever strokes, ie. two strokes per lever, are required to rotate the sprocket gear 34 one revolution. Since the lever arms alternate strokes, the pair of cams 28 and 29 are arranged so as to effectively divide the sprocket gear 34 into four equal parts of rotation. It is for this reason that the cams 28 and 29 are arranged normal with respect to one another so that in a side elevational view, the rollers 30, 31, 32 and 33 are arranged 90° with respect to adjacent rollers.

Referring in further detail to FIG. 1, means are provided for insuring that the separate pair of lever-cam units or means remain coordinated at all times. To achieve this end, the means is a timing system which not only locks the two lever-cam units into synchronization, but is responsible for returning the lever arms to their respective up positions preparatory for receiving applied loads in a downward direction. The timing means includes a timing axle 40 having its opposite ends rotatably carried between brackets 41 and 42 downwardly depending from the frame 18. Each lever arm is connected to a respective end of the timing axle by a rocker crank arm such as is indicated by numerals 43 and 44 respectively. A drive gear 45 is attached to the main axle 25 and is connected in driving relationship to a pinion gear 46 by means of a chain 47. Gear 45 is provided with 18 teeth and is linked by chain 47 to the gear 46 which is provided with 9 teeth. Since the smaller gear turns twice as fast as the larger gear, both lever arms can be controlled at the same time. Each timing rocker crank arm 43 and 44 is mounted on the opposite ends of the timing axle facing in opposite directions. Power which is being applied to the ready position lever arm travels through the timing system and acts on the down position lever arm to return it to the ready position. As the timing rocker crank arms or lengths 43 and 44 reaches the peak of its respective rotation, it begins to bring its force to bear upon the lever arm so as to draw it downwardly and thereby, lifting the long end portions of the lever arm.

At the bottom half of the timing rocker crank arms rotation, the timing arm becomes unable to effect the lever arm. The lever arm is at this time applying force to the cam means. When the lever has reached the end of its stroke, the timing arm is again able to draw the lever downwardly. The cycle is now complete. The lever arms force is used to stroke the gear and pinion and the timing system controls the lever arm.

Referring in detail to FIG. 2, it can be seen that the lever arms move differentially and that the portions 16 are substantially shorter than the elongated portions which terminate in the ends 15 and 15 prime to which the input force is applied.

Referring to FIG. 3, it can be seen that the rollers associated with cam 29 will alternately rollably engage with the cam surface 17 prime as the lever arm 15 prime is rotated about its pivot or fulcrum 14.

In actual practice, the lever power system described above may readily be employed for powering a vehicle such as a bicycle for example. The bicycle is indicated in the general direction of arrow 50 and it can be seen that the frame 18 is attached to the bike frame 51 by the respective mounting pins 20 and 21 inserted into receiving fixture 52. The eyelets 22 and 23 are respectively attached to the axle of the rear wheel 53 of the bike so that the lever arms 15 and 15 prime are separated by the frame of the bike as well as the rear wheel 53. The user of the bike may sit on the seat 54 as is the conventional practice and the rider's legs and feet are positioned against the shoe stops 55 and 56 attached to the input ends 15 and 15 prime of the lever arms 11 and 12. The feet of the rider may then alternate by applying pressure downwardly against the input ends of the lever arms so that one lever is going down and the other lever arm is moving upwardly. The input power applied is translated into movement of the rear axle and rear wheel 53 of the bike via turning of the gear 34 and the drive gear 35. In this instance, the driveshaft 36 is the rear axle of the rear wheel 53.

Therefore, it can be seen that the leverage power system of the present invention is useful in two general catagories of energy production and transportation. The inventive concept may be employed with energy production because it is by defination a prime mover. The inventive concept is useful as a prime mover because it receives and modifies energy as supplied by various natural sources. The natural forces may take the form of power received from a variety of conditions such as wind, river or stream, waterfall, or wave power.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a power multiplier apparatus for translating an input power force into an increased power output, the combination comprising:

a power multiplier unit having lever means characterized as having a mechanical advantage greater than one;

drive means including a main axle for imparting a driving force constituting said increased power output to a load;

cam means operably interconnecting said lever means to said drive means for transmission of power therebetween;

a timing means operably interconnecting said cam means with said lever means for maintaining synchronization between said cam means and said lever means;

said timing means includes a timing axle rotatably carried in parallel spaced apart relationship with respect to said main axle;

a driven timing gear fixed on said timing axle and a drive timing gear of greater diameter carried on said main axle;

a timing chain operably coupled about said drive and driven timing gears; and a crank shaft and connecting arm means movably mounting said timing axle to said lever arms.

* * * * *